March 3, 1942.   R. M. MAGNUSON   2,275,302
ADJUSTABLE AXLE CONSTRUCTION
Filed Aug. 7, 1939

INVENTOR
ROY M. MAGNUSON
BY Philip A. Minnis
ATTORNEY

Patented Mar. 3, 1942

2,275,302

UNITED STATES PATENT OFFICE 2,275,302

ADJUSTABLE AXLE CONSTRUCTION

Roy M. Magnuson, San Jose, Calif., assignor to Food Machinery Corporation, San Jose, Calif., a corporation of Delaware Application August 7, 1939, Serial No. 288,699

7 Claims. (Cl. 280—5)

The present invention relates to an axle construction for mounting the traction wheels of fruit and vegetable spraying machines or similar agricultural equipment to the frame and body structure thereof.

One object of the present invention is to provide an adjustable axle construction for fruit and vegetable spraying machines for mounting the traction wheels thereof with respect to the frame and body structure of the machine to provide the necessary clearance for various ground and crop conditions.

Another object of the present invention is to provide an adjustable axle construction for vertical adjustment of the traction wheels for permitting proper adjustment of the draw bar height of the vehicle structure.

A further object of the present invention is to provide an axle construction for horizontal adjustment of the traction wheels for proper balancing of the vehicle structure, for compensating for change and distribution in weight of the same, and for permitting redistribution of the weight of the vehicle structure and the load carried thereon relative to the traction wheels thereof in any desired manner.

Another object is to provide an adjustable axle construction for independent adjustment of the traction devices of a vehicle in horizontal and vertical directions relative to the frame structure of the same.

Another object is to provide an adjustable axle construction for vehicles of the nature referred to herein which is of rigid, simple, and inexpensive construction and especially suitable for withstanding the strain to which equipment of this nature is subjected in practice.

Other and further objects and advantages of the present invention will become apparent from the following description and drawing, in which.

Figure 1:
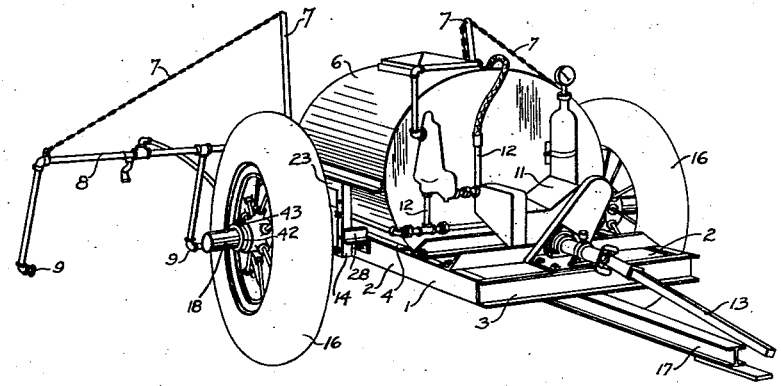
Fig. 1 is a perspective view of a fruit or vegetable spraying machine provided with the adjustable axle construction of the present invention.

Referring now to the drawing and especially to Fig. 1 thereof, 1 indicates the frame structure of a spraying machine which consists of longitudinal frame members 2 and transverse members 3. Mounted upon the frame structure 1 by means of bed plates 4 is a tank 6 of cylindrical or preferably oval-shaped configuration in cross section which is adapted to contain a spraying liquid. Supported adjacent the rear end of the frame structure 1 by means of supporting members 7 is a nozzle boom 8 provided with spray nozzles 9. A pump 11 positioned upon the front end of the frame 1 facilitates the supply of the spray fluid from the tank over pipe lines 12 to the nozzle boom 8 from where it is discharged from the nozzles 9 against the plants to be treated.

The pump 11 may be driven from the power take-off of the engine of a tractor vehicle by means of a drive shaft 13, or, if desired, may be operated by means of a separate power engine mounted upon the front end of the frame 1.

Rigidly secured to the frame members 2 of the frame 1 and tank 6 are adjustable axle units 14 upon which rubber-tired traction wheels 16 are mounted in any conventional manner. Only one of these axle units 14 has been shown in Fig. 1. It has to be understood, however, that in the construction shown in Fig. 1 two axle units are employed, one for each of the traction devices illustrated. Both of these axle units are of the same construction and the illustration and description of one is therefore deemed sufficient for the purposes herein.

The front end of the frame 1 is provided with a draw bar 17 adapted to be attached to a tractor vehicle for propelling the spraying machine over the ground and past the plants to be treated by the spraying liquid discharged from the nozzle 9 thereof.

Each of the axle units 14 consists of a stub axle 18 which is welded, or secured in any other manner, to a supporting plate 19 adjustably mounted within an axle frame 21. The axle frame is constructed of vertical angle irons 22 and a horizontal angle iron 23 welded together to form a frame of U-shaped configuration.

The vertically extending front flanges of the axle frame 21 are provided with a plurality of holes as shown at 24 and the plate 19 is also provided with a plurality of holes 26 adapted to register with certain ones of the holes 24 depending upon the position of the plate 19 within the axle frame 21. Bolts 27 extending through the holes in the plate 19 and the holes in the axle frame in registry therewith are employed to secure the plate 19 to the axle frame 21 in any desired vertical position.

Welded to the sides of the vertically extending portions of the axle frame 21 are brackets 28 which extend transversely therefrom toward the longitudinal frame member 2. An angle iron 29 welded to the free ends of the brackets 28 and extending parallel to the frame member 2 is provided with holes 31 which are adapted to register with certain ones of corresponding holes 32 in the frame member 2 depending upon the position of the axle frame with respect to the frame member 2. Bolts 33 extending through the openings 31 and 32 are employed to secure the brackets 28 and the lower portion of the axle frame to the frame member 2 in a rigid manner.

Figure 2:
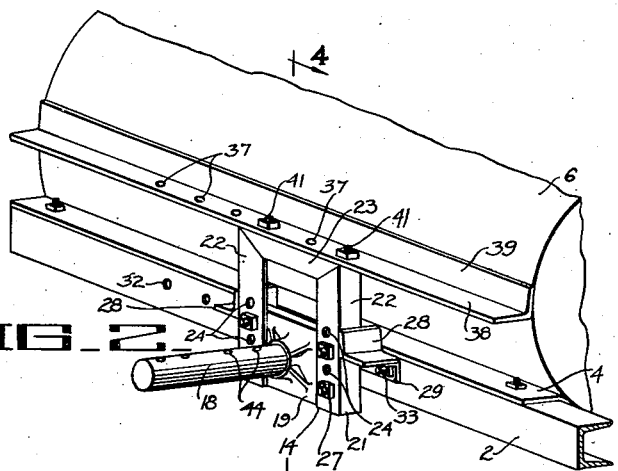
Fig. 2 is an enlarged perspective view of the axle construction of the present invention together with a portion of the frame and body structure of the spraying machine with which it is cooperatively associated.
Figure 3:
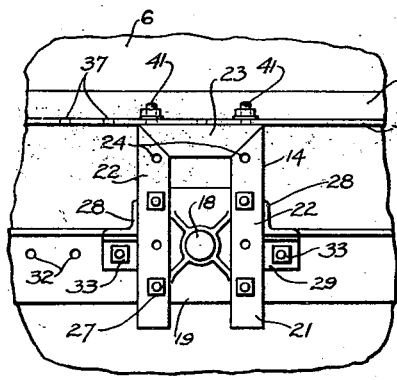
Fig. 3 is a front view of the adjustable axle construction shown in Fig. 2.

The upper horizontal flange 34 of the axle frame 21 is provided with holes 36 adapted to register with holes 37 in the horizontal flange 38 of an angle iron 39 extending longitudinally of the tank 6 and welded to the side thereof in a manner as clearly seen in Fig. 2. Bolts 41 extending through registering holes 36 and 37 are employed to secure the upper portion of the axle frame 21 to the angle iron 39 and tank 6 in desired positions of longitudinal adjustment.

The angle iron 39 reinforces the side wall of the tank 2 and distributes the load received thereby over a large area of the wall of the tank 6.

The traction wheels 16 are retained on the stub axles 18 by means of retaining collars 42 and lock screws 43 cooperating with holes 44 in the axle 18. By engaging the lock screws 43 of the retaining collars 42 with one or the other of said holes 44, the traction wheels 16 may be independently adjusted in transverse directions with respect to the frame 1.

Figure 4:
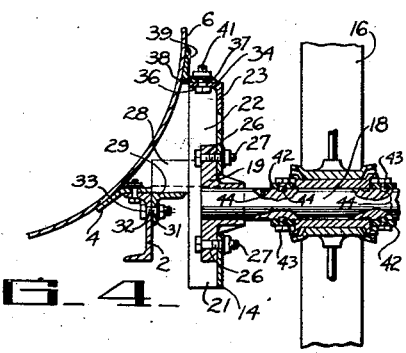
Fig. 4 is a sectional view taken along the lines 4—4 in Fig. 2.

From Fig. 4 of the drawing it will be observed that the axle frame 21, tank 6, brackets 28, and frame member 2 form a triangular bracing structure for the axle 18 which will effectively resist the twisting strain exerted by the axle under load conditions. The shape of the tank and the horizontally extending reinforcing member 39 promote the rigidity of the structure very materially, as will be obvious to those skilled in the art.

From the foregoing it will therefore be seen that the stub axle 18 and its supporting plate may be readily adjusted in vertical directions relative to the axle frame, while the latter, in turn, may be adjusted in longitudinal directions relative to the frame 1 and tank 6.

By means of the vertical adjustment the axles of the spraying machine may be adjusted to any desired clearance to suit various ground conditions or to obtain any desired draw bar height of the vehicle structure, while the longitudinal adjustment of the axle and axle frame permits adjustment of the axle 18 for proper balancing of the frame and body structure and redistribution of the weight in any desired manner. This latter adjustment permits the addition of one or two wheels at the front end of the frame so that the vehicle structure may be changed from a two to a three or four-wheel vehicle and the weight may be properly distributed between the wheels as desired.

It will be further noted that the rigid bracing of the axles by utilizing the tank as a portion of the bracing structure permits a simple and efficient construction, without the necessity of any bracing members or supporting rods extending below the frame structure of the vehicle, which would reduce the ground clearance thereof to a material degree.

The transverse adjustment of the traction wheels with respect to the frame 1 permits adjustment of the tread of the wheels for any desired row crop conditions.

From Fig. 4 it will be noted that the adjustable axle frame is secured to the brace 39 of the tank 6 in a horizontal plane while the bracket 28 and angle iron 29 permit attachment of the axle frame to the frame member 2 of the vehicle in a vertical plane. This simplifies considerably the assembly of the parts and prevents the creation of twisting stresses during installation or adjustment of these parts, as the axle frame 21 and its associated parts may, so to speak, adjust themselves in a vertical direction under load conditions in such a manner that substantially all vertically-acting forces are received by the axle frame through the brace member 39, while substantially all twisting stresses are received by the frame member 2 through the bracket 28 and angle iron 29.

While I have described a particular embodiment of the present invention, it is to be understood that I do not wish to be limited to the specific structure of the same, as many changes may be made within the purview of the appended claims.

Having thus described my invention and in what manner the same may be used, what I claim as new and desire to protect by Letters Patent is:

1. A vehicle structure comprising a frame, a tank mounted upon said frame, bracing means secured to said tank extending longitudinally thereof and parallel to said frame, an axle frame secured to said bracing means, means extending from said axle frame transversely with respect to said frame for securing said axle frame to said frame, traction means, and an axle mounted on said axle frame for securing said traction means thereto whereby under load condition substantially all stresses in a vertical direction are received by said axle frame from said bracing means and substantially all twisting stresses are received by said frame.

2. A vehicle structure comprising, a frame having longitudinally-extending members at each side thereof, a tank having longitudinally-extending members secured to each side thereof, and means for mounting a stub axle on each side of the vehicle, each of said mounting means including a rigid sub-frame having a horizontal surface in engagement with and secured to one of said longitudinal tank members and having a vertical surface in engagement with and secured to one of said longitudinal frame members.

3. A vehicle structure comprising, a frame, said frame having a longitudinally-extending member at each side thereof, a tank mounted upon said frame with the bottom portion of said tank extending down between said longitudinally-extending side members of said frame, means to rigidly secure said tank directly to said side members, longitudinally-extending reinforcing means rigidly secured to the sides of said tank, said reinforcing means being disposed above and spaced apart from said frame side members, and means for mounting a stub axle on each side of the vehicle, each of said mounting means including a rigid framework secured to both said tank reinforcing means and said frame side member.

4. A vehicle structure comprising a frame, a tank mounted upon the frame, said frame including side rails extending longitudinally of the tank, brackets secured to the sides of said tank above said side rails, an axle supporting frame on each side of said vehicle, each of said axle supporting frames being secured at its upper portion to one of said brackets, and at its lower portion to the side rail therebeneath, an axle secured in each of said frames, and means for adjustably securing said axle to said frame in different positions relative thereto.

5. A vehicle structure comprising a frame, a tank mounted upon the frame, said frame including side rails extending longitudinally of the tank and having outer side faces, outwardly flanged brackets secured to the sides of said tank above said side rails, an axle supporting frame on each side of said vehicle, each of said axle supporting frames being secured at its upper portion to the under side of the flange of one of said brackets, and at its lower portion to the outer side face of the side rail therebeneath, and means for adjustably securing said axle to said frame in different positions relative thereto.

6. A vehicle structure comprising a frame, a tank mounted upon the frame, said frame including side rails extending longitudinally of the tank and having outer side faces, outwardly flanged brackets secured to the sides of said tank above said side rails, and means on each side of said vehicle for mounting an axle for vertical and longitudinal adjustment relative thereto, each of said axle mounting means including an axle support secured at its upper portion to the under side of the flange of one of said brackets and at its lower portion to the outer side face of the side rail therebeneath.

7. A vehicle structure comprising a frame, a tank mounted upon the frame, said frame including side rails extending longitudinally of the tank, brackets secured to the sides of said tank above said side rails, means on each side of said vehicle mounting an axle for vertical and longitudinal adjustment relative to the vehicle, each axle mounting means including an axle supporting frame adjustably secured at its upper portion to one of said brackets and in its lower portion to the side rail therebeneath, and an axle supporting plate adjustably secured in the axle supporting frame.

ROY M. MAGNUSON.